Oct. 7, 1924.   1,510,923
A. COSEY
ARTIFICIAL BAIT
Filed May 12, 1922
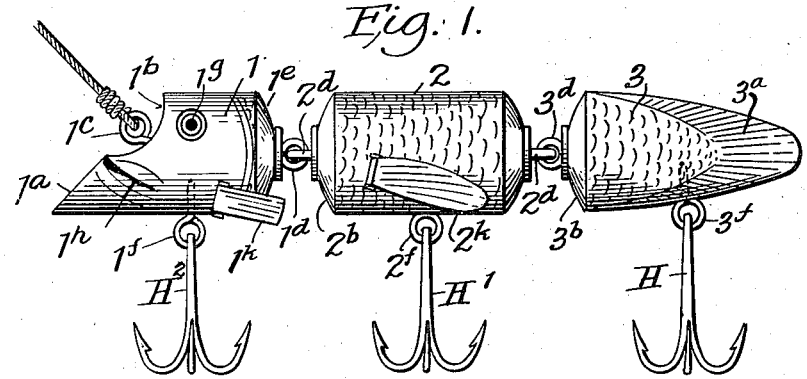
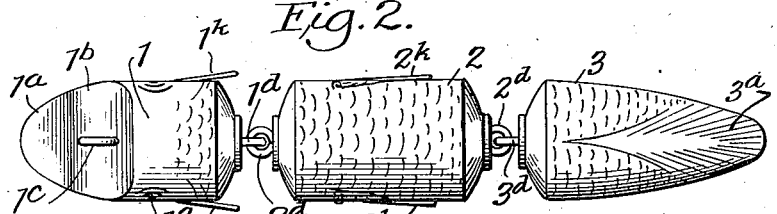
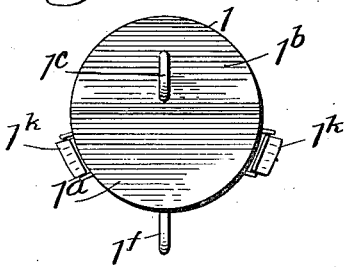
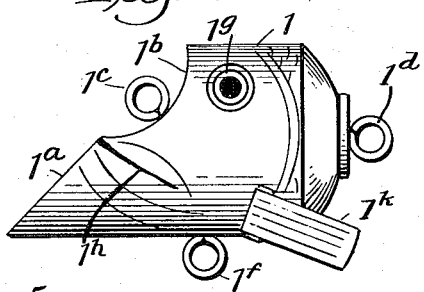
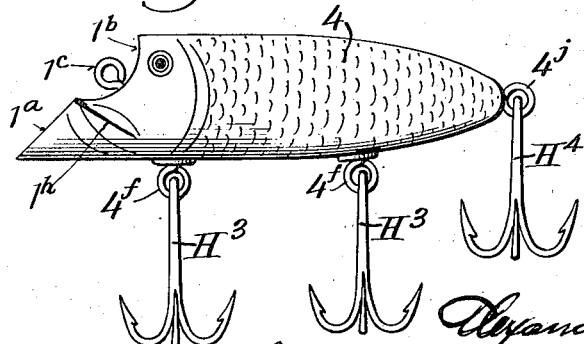

Patented Oct. 7, 1924.

1,510,923

UNITED STATES PATENT OFFICE.

ALEXANDER COSEY, OF CAMBRIDGE, NEW YORK.

ARTIFICIAL BAIT.

Application filed May 12, 1922. Serial No. 560,343.

*To all whom it may concern:*

Be it known that I, ALEXANDER COSEY, a citizen of the United States, residing at Cambridge, in the county of Washington and State of New York, have invented certain new and useful Improvements in Artificial Baits; and I hereby declare that the following is a full, clear, and exact description thereof, reference being had to the accompanying drawings, which form part of this specification.

This invention is a novel artificial bait for use in fishing. Its object is to provide an artificial bait which, when not in action, will float on the water, but, when pulled, will automatically dive beneath the surface and travel at a proper depth beneath the surface of the water and move from side to side very much like a live small fish would move, this making a very attractive lure for larger fish.

I will describe the invention with reference to the accompanying drawings which illustrate practical embodiments thereof and which will enable others to adopt and use the same; and in the claims summarize the novel features for which protection is desired.

In said drawings:

Fig. 1 is a side view of a large or three section bait.

Fig. 2 is a top plan view thereof.

Figs. 3 and 4 are enlarged front and side views of the head section, detached.

Fig. 5 is a side view of a small or single section bait.

The larger bait comprises a head section 1, middle section 2, and tail section 3; each of such sections is preferably round in cross section, and of suitable length and size, and preferably of wood or other material sufficiently buoyant to float on the water when not being pulled therethrough.

The head section 1 has its front end cut on a bevel, as indicated at 1ª, the bevel sloping upwardly and rearwardly at an angle of about 45° from the base of the section to the top thereof, and the lower portion of this beveled end 1ª is flat on its upper surface.

In the upper part of the front end of the head section is a transverse concave recess or cut 1ᵇ which intersects the tapered portion 1ª at right angles, and is approximately about one third of a circle in extent and principally lies above the longitudinal axis of the head 1. A screw eye 1ᶜ or other suitable device may be attached to the head end within the recess 1ᵇ for the attachment of the line.

The rear end of the head member is preferably slightly rounded, as at 1ᵉ, and at the center thereof is provided a screw eye 1ᵈ or other suitable connection for engagement with a similar screw eye 2ᵈ on the middle section 2 (or tail section 3). The aforesaid peculiar formation of the front end of the head is of the greatest importance, as this peculiarly shaped head causes the bait when pulled through water to first submerge and then to wiggle sidewise or back and forth from right to left, as it travels through the water. The submerging is caused by the bevel 1ª and the concave recess 1ᵇ regulates the depth at which the bait will travel when in action. By reason of the peculiar formation of the head end when the bait is pulled through the water the pressure of the water on the flat beveled portion 1ª causes the bait to dive down until the pressure of the current of water in the transverse concave recess 1ᵇ counteracts the diving pressure. In practice with a bait head shaped as shown and about ¾″ in diameter the bait would travel about 18″ below the surface and would remain at that depth while being pulled through the water and the water enters the circular recess, passes out first at one side thereof and then at the other, and causes the bait to zigzag and rock and dive when pulled through the water and come to the surface only when it is not pulled. The bait shown in Fig. 1 is guided by the head end cut and the action of the water on the head end or shoulders of each section of bait tends to make it go like a snake through the water, and to keep its depth under water when in action, and this peculiar head end cut gives the bait a very snappy action when pulled through water.

The middle section 2 may be slightly rounded at its ends, as at 2ᵇ, and may be provided with a screw eye or other suitable connecting device 2ᵈ to engage the screw eye or connecting device 1ᵈ on the head, and flexibly couple it thereto as shown. The middle section also has a screw eye or other suitable device 2ᵈ to engage a corresponding device 3ᵈ on the forward end of the tail section 3.

The tail section or member 3 is approximately of the same diameter at its forward end as the members 1 and 2, but is tapered to the rear somewhat like a blunt nosed bullet as shown at 3$^a$. The forward end of the tail member is preferably slightly rounded as at 3$^b$ and may be provided with a screw eye 3$^d$ or other suitable connecting device to engage the screw eye 2$^d$ on the body member 2 (or 1$^d$ on the head 1).

The head 1 may also be provided with a screw eye or other suitable device 1$^f$ on its lower side for the attachment of hook H$^2$. The middle section 2 may be provided with screw eye or other suitable device 2$^f$ on its under side for attachment of hooks H′; and the tail member 3 may be provided with a screw eye or other suitable device 3$^f$ for the attachment of hooks H.

The head member may have fins 1$^k$ loosely fitted or hinged to its sides as at 1$^x$ or in any desired manner; and the middle member 2 may be provided with similar fins 2$^k$ similarly fitted or hinged thereto as at 2$^x$ or in any suitable manner. When the fins are used they would preferably be differently colored from the rest of the body to make it look more like a real fish.

The bait may be painted or colored as desired, to enhance its attractiveness as a lure to the fish; thus the head member may be provided with representation of eyes and mouth as indicated at 1$^g$, 1$^h$. The tail member may be painted to resemble the tail-fins of a small fish if desired. The particular coloring and external imitation or camouflage features are not essentials of the invention.

When fishing for smaller fish the mid section 2 could be removed and the tail member 3 directly connected with the head member 1.

For still smaller fish the head and tail may be formed in one piece as illustrated in Fig. 5. In this case the body 4 has its head end formed like the front end of head 1 as above described, similar parts being similarly lettered, while the tail end of part 4 may be formed like the tail end of member 3, like parts being similarly lettered. This small bait may have two screw eyes or other devices 4$^f$ on its under side for attachment of hooks H$^3$, and may also have a screw eye 4$^j$ at its rear end for the attachment of a hook H$^4$. Such a hook H$^4$ might also be attached to the tail member 3 if desired.

The bait will float when not in action as it has no weights to keep it submerged. When the bait is pulled by reeling the line the part 1$^a$ causes it to dive down about 18 inches under water, then the action of the water entering the concave recess 1$^b$ prevents it from going any deeper, so that it does not catch on the bottom or on grass, etc., near the bottom. The recess also causes the head to sway first to right and then to left, moving about 5 inches either way, thus nosing along like a live shiner or small fish, and at each side motion the bait will make a slight downward dive. The peculiar head end cut of my bait positively makes it wiggle in use, and the sections 2 and 3 work snappily thereafter like a swimming live fish; my bait when in action having all the appearance of a live swimming bait. My bait is much lighter to use on a casting rod than a live bait, and can be used by anybody regardless of experience at fishing and using lures. Also it requires no adjustment. It is always ready for use; and all that is necessary for the fisherman to do is to tie a line to the bait and troll or cast.

What I claim is:

1. An artificial bait member having its front end beveled at an angle of approximately 45° inclining upwardly and rearwardly, the lower part of said beveled portion being flat surfaced on top, and a transverse concave recess in and below the surface of the upper portion of said beveled portion, the beveled portion being adapted to cause the bait to dive when pulled through the water and the concave recess adapted to limit the diving movement of the bait and cause it to move from side to side.

2. An artificial bait member having its front end beveled at an angle of approximately 45°, inclining upwardly and rearwardly, the lower parts of said beveled portion having a flat upper surface and a transverse concave recess in and below the surface of the upper portion of said beveled surface extending about one third of a circle, the flat part of the beveled portion being adapted to cause the bait to dive when pulled through the water, and the concave recess being adapted to limit the diving movement of the bait and also cause it to move from side to side.

In testimony that I claim the foregoing as my own, I affix my signature.

ALEXANDER COSEY.